Figure 1:
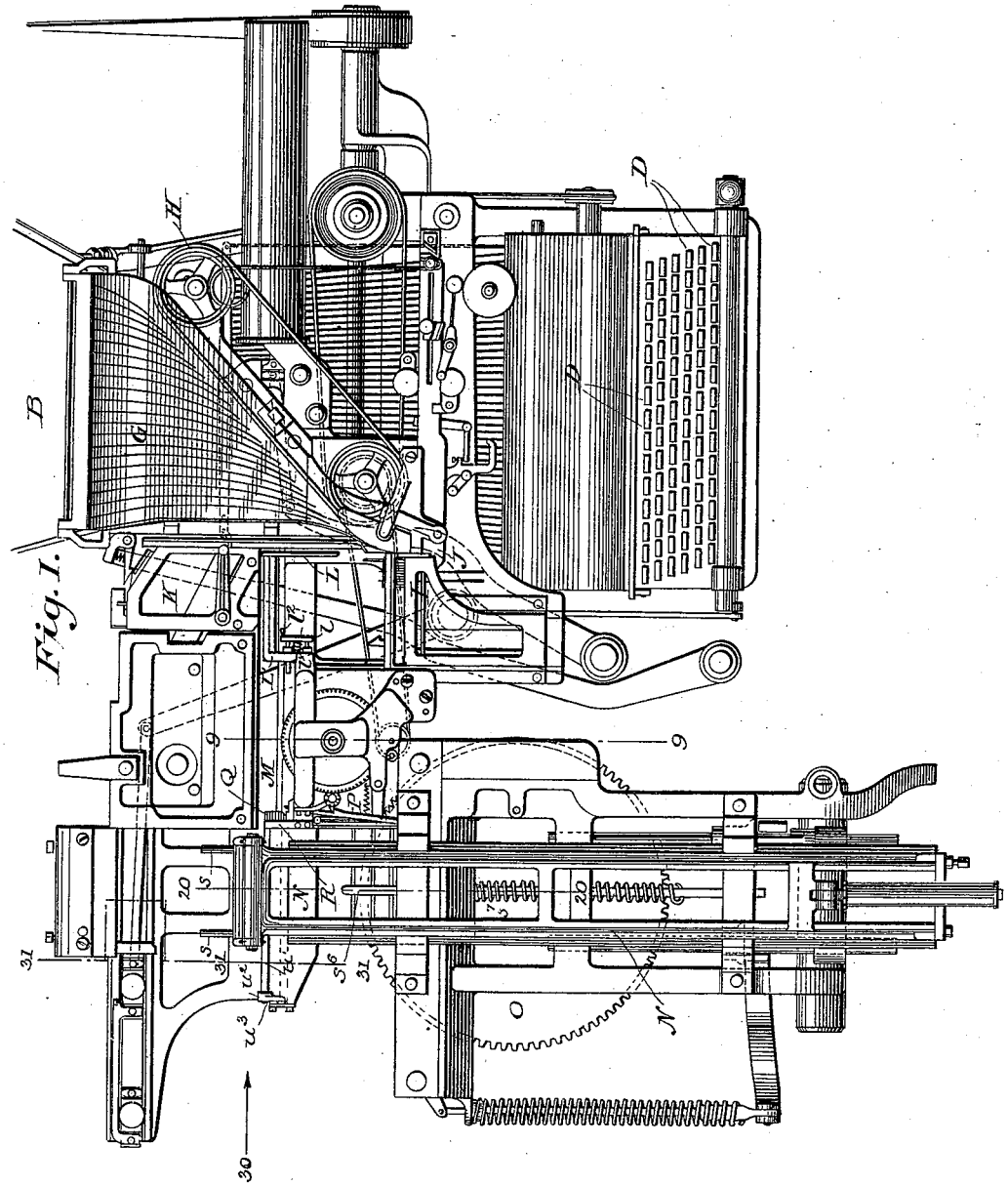

(No Model.) 8 Sheets—Sheet 1.

O. MERGENTHALER.
LINOTYPE MACHINE.

No. 565,487. Patented Aug. 11, 1896.

Witnesses
Raymond H. Barnes.
Fabius A. Elmore.

Inventor
Ottmar Mergenthaler
By Phil T. Dodge
Attorney (No Model.) 8 Sheets—Sheet 2.

O. MERGENTHALER.
LINOTYPE MACHINE.

No. 565,487. Patented Aug. 11, 1896.

on line 6-6.

Witnesses
Raymond F. Barnes
Fabius D. Elmore

Inventor
Ottmar Mergenthaler
By Phil. T. Dodge
Attorney (No Model.)  8 Sheets—Sheet 3.
O. MERGENTHALER.
LINOTYPE MACHINE.
No. 565,487.  Patented Aug. 11, 1896.
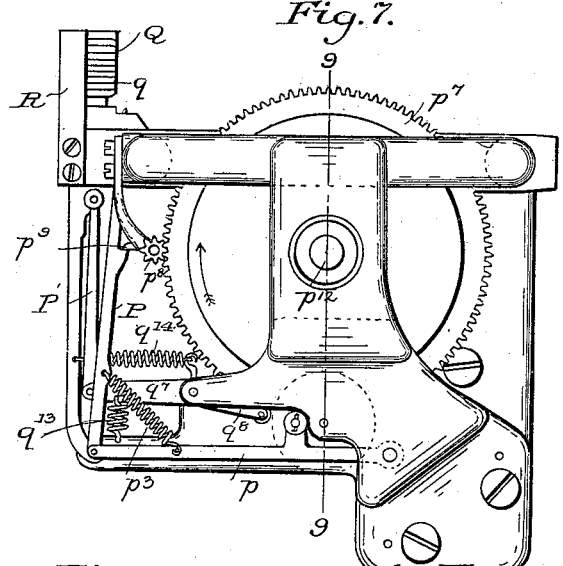

(No Model.) 8 Sheets—Sheet 4.
O. MERGENTHALER.
LINOTYPE MACHINE.
No. 565,487. Patented Aug. 11, 1896.
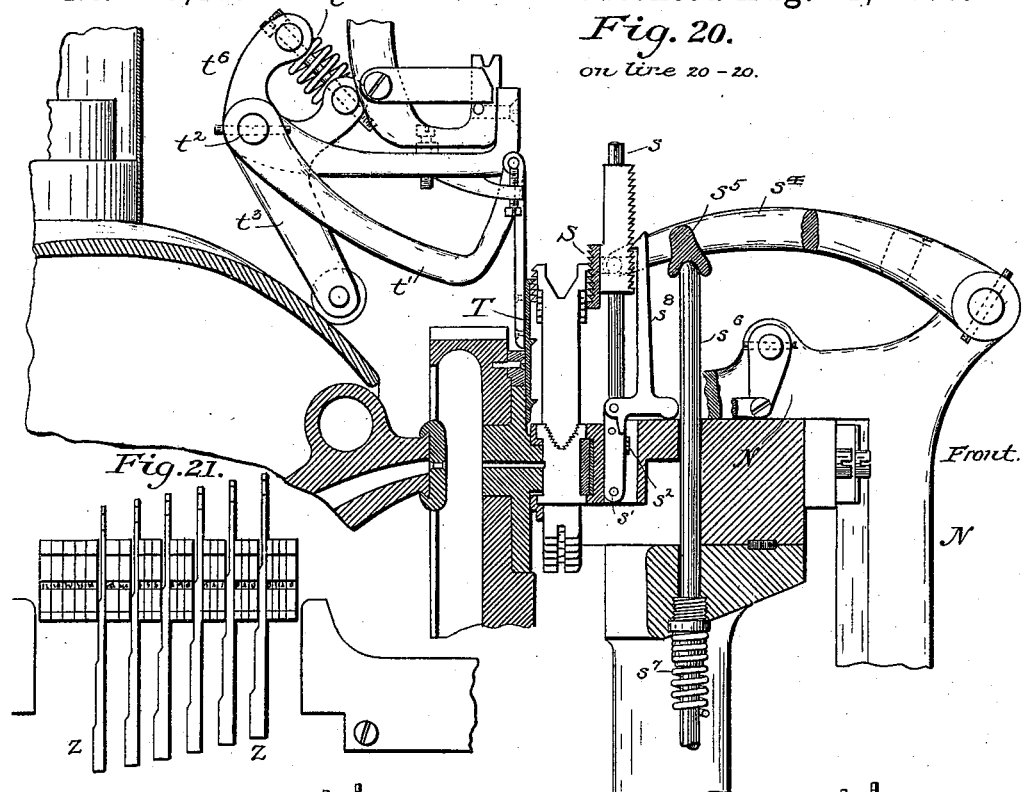
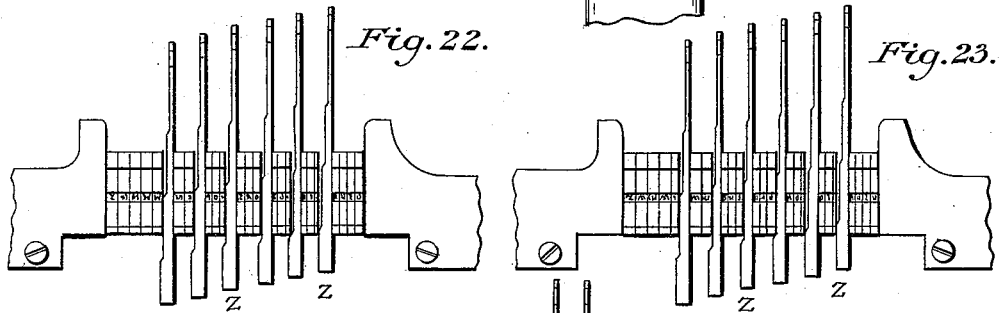
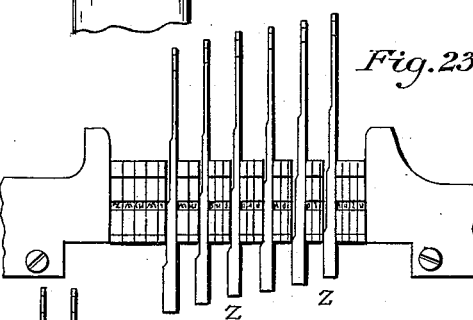
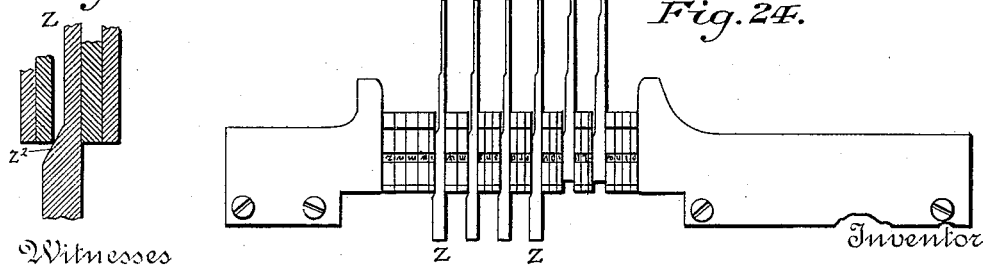
Witnesses
Raymond F. Barnes.
Fabius S. Elmer.
Inventor
Ottmar Mergenthaler
By Phil. T. Dodge
Attorney
THE NORRIS PETERS CO., PHOTO-LITHO., WASHINGTON, D. C.

(No Model.) 8 Sheets—Sheet 5.
O. MERGENTHALER.
LINOTYPE MACHINE.
No. 565,487. Patented Aug. 11, 1896.
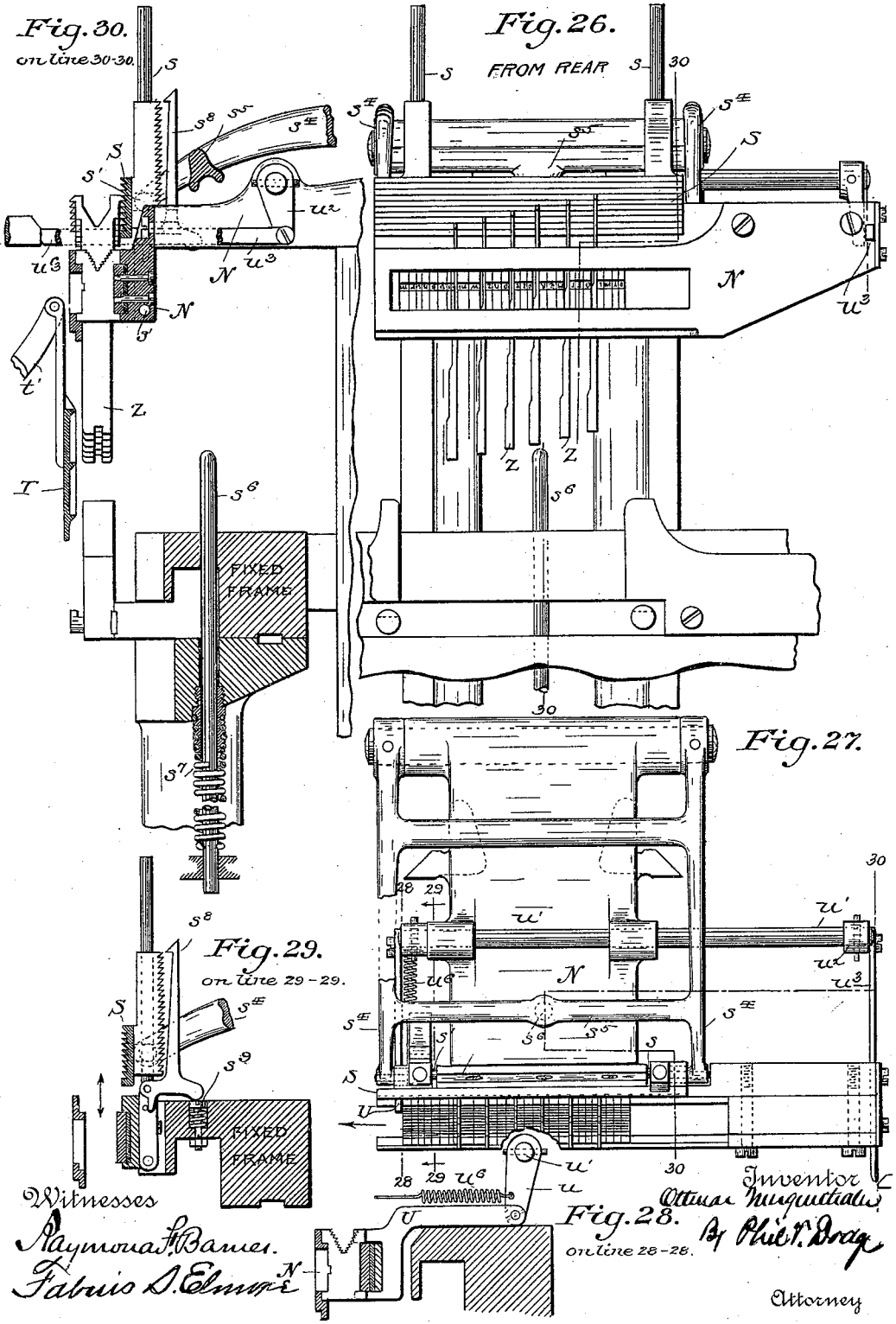
Witnesses
Raymond F. Barnes.
Fabius D. Elmore.
Inventor
Ottmar Mergenthaler
By Phil. T. Dodge
Attorney
THE NORRIS PETERS CO., PHOTO-LITHO., WASHINGTON, D. C.

(No Model.) 8 Sheets—Sheet 6.
O. MERGENTHALER.
LINOTYPE MACHINE.
No. 565,487. Patented Aug. 11, 1896.
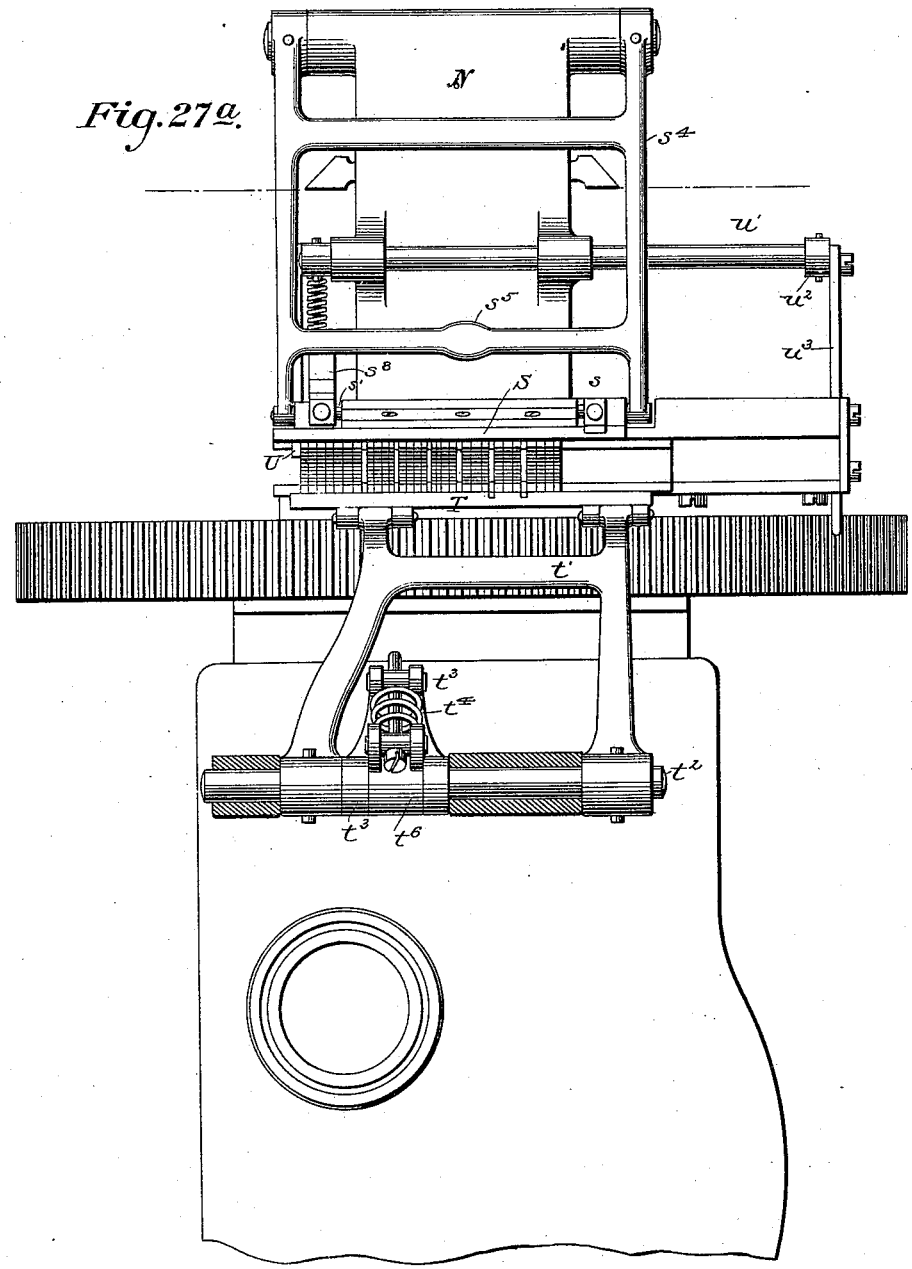

(No Model.) 8 Sheets—Sheet 7.

O. MERGENTHALER.
LINOTYPE MACHINE.

No. 565,487. Patented Aug. 11, 1896.

Witnesses
Raymond F. Barnes
Fabius A. Elmore

Inventor
Ottmar Mergenthaler
By Phil. T. Dodge
Attorney (No Model.) 8 Sheets—Sheet 8.
O. MERGENTHALER.
LINOTYPE MACHINE.
No. 565,487. Patented Aug. 11, 1896.
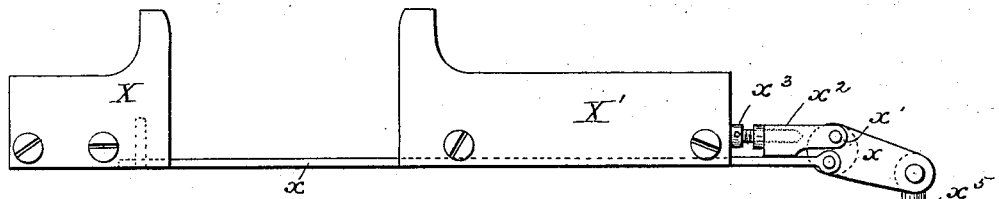
Fig. 33.
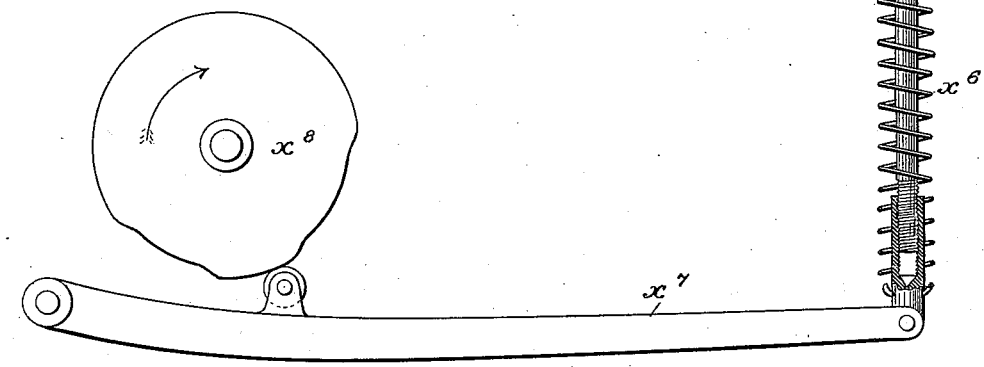
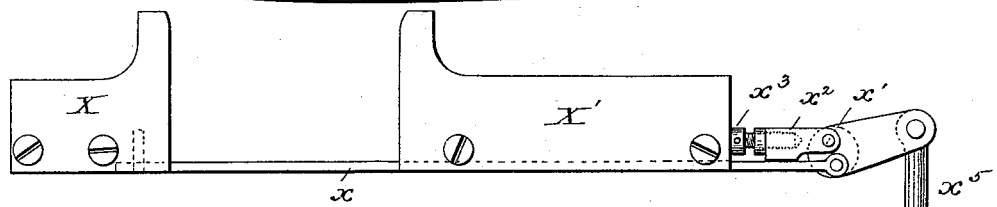
Fig. 34.
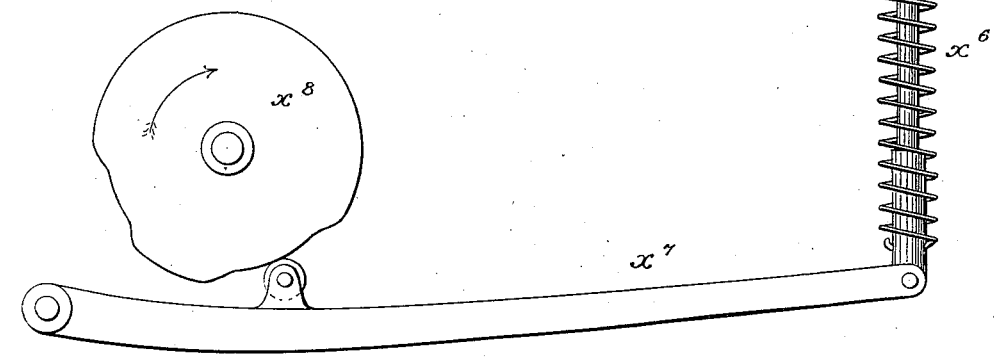
Witnesses
Raymond F. Barnes.
Fabius S. Elmor.
Inventor
Ottmar Mergenthaler
By Phil. S. Dodge
Attorney

UNITED STATES PATENT OFFICE.

OTTMAR MERGENTHALER, OF BALTIMORE, MARYLAND, ASSIGNOR TO THE MERGENTHALER LINOTYPE COMPANY, OF NEW YORK, N. Y.

LINOTYPE-MACHINE.

SPECIFICATION forming part of Letters Patent No. 565,487, dated August 11, 1896.

Application filed July 24, 1893. Serial No. 481,339. (No model.)

*To all whom it may concern:*

Be it known that I, OTTMAR MERGENTHALER, of Baltimore, State of Maryland, have invented a new and useful Improvement in Linotype-Machines, of which the following is a specification.

This invention has reference to means for spacing out or justifying composed lines of type matrices or dies after the composition is completed to a predetermined length.

The invention is intended more particularly for use in the well-known Mergenthaler linotype-machine, in which a metal slug or linotype is cast in a mold against a composed line of matrices presented momentarily against and closing one side of the mold, the spaces in the line serving not only to effect its justification but also to coöperate with the adjacent matrices in closing the mouth of the mold to prevent the leakage of molten metal.

I propose to employ for the purpose of justification a series of elongated space-bars, each increasing in thickness step by step from one end toward the other, these spaces being introduced, primarily, with their thin ends in the line and thereafter advanced endwise so as to introduce their thicker portions into the line until the latter is elongated or justified to the proper limit. During the course of composition each line is set or composed to as near its final length as possible, but there will remain at the end of each line a space insufficient to permit the introduction of another word or syllable. This remaining space, requiring to be filled out, differs in different lines and cannot practically be ascertained in advance of the completion of the composition of the line. It is obvious that if all of the stepped spaces in the line are advanced simultaneously the line will be elongated a definite and invariable distance. In practice it is frequently found that the space remaining to be filled is insufficient to permit the advance of all the spaces, and it therefore becomes necessary to advance one or more of the spaces through the line to a greater distance than the others, thus introducing into the line, toward the completion of justification, an amount represented by the rise or lift of one step on one, two, or more spaces.

Now the present mechanism is directed to the automatic adjustment of the spaces to this end and is based upon the idea of advancing the successive spaces into the line different distances in the first instance, and thereafter advancing them all to definite positions so that each space, presenting a greater or less thickness in the line, will be certain to fit tightly against the adjacent matrices and between them close the mold, as covered, broadly, in the application of Mergenthaler and Muehleisen, Serial No. 479,370, filed July 1, 1893.

I have represented my improvement as embodied in a linotype-machine of the character described in Letters Patent of the United States issued to me on the 16th day of September, 1890, No. 436,532, and I have shown those details of construction which I deem best adapted for use in this machine, but it is to be understood that my improvement is applicable in any and all machines in which matrices, dies, or type are set up in lines and thereafter justified, and it is also to be understood that the details of construction may be widely modified within the range of mechanical skill, the only essential requirement being that the mechanism shall impart to the stepped spaces substantially the movements hereinafter explained.

I have limited the drawings to those portions of the machine which are necessary to an understanding of the present invention, and it is to be understood that in all other respects the details may be of the character shown in the above-mentioned patent, or in accordance with the construction now commonly in use in the art.

Figure 2:
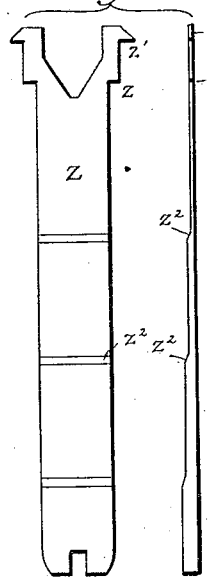
Figures 3, 4:
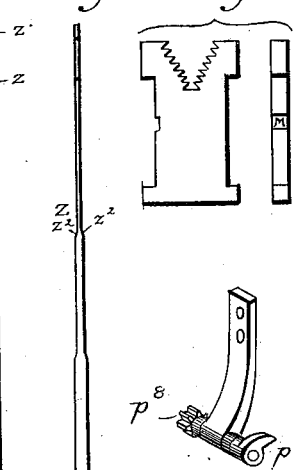

Figure 1 is a front elevation of the composing, transferring, and casting mechanism of the Mergenthaler machine with my improvement incorporated therein. Fig. 2 represents a side elevation and edge view of my space-bar in its preferred form with the steps on one side only. Fig. 3 is an edge view of my space-bar with the steps on both faces. Fig. 4 is a side and an edge view of one of the matrices, which are of ordinary construction. Fig.

Figure 19:
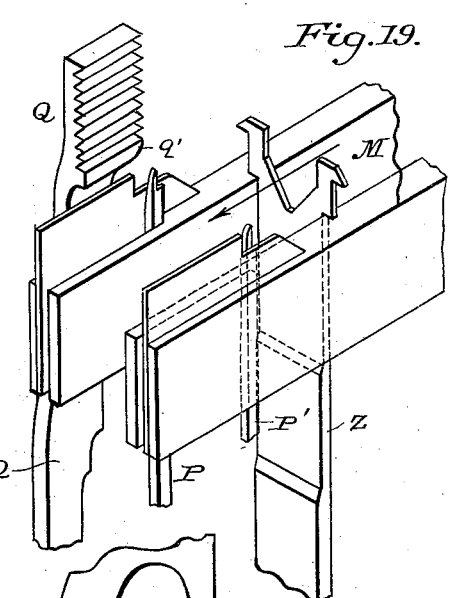
Figure 5:
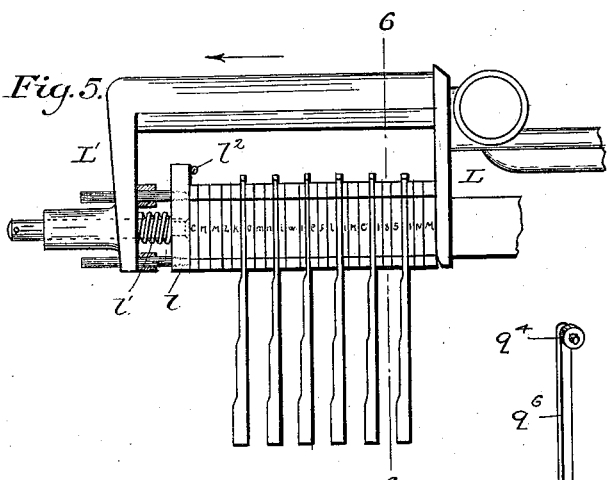
Figure 6:
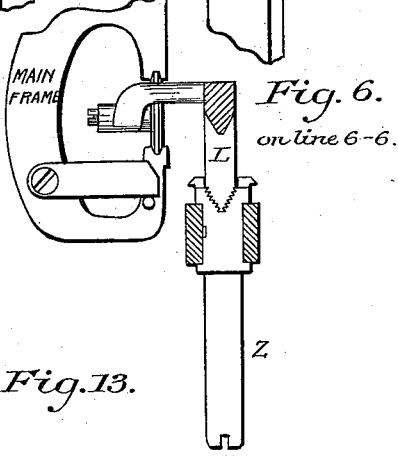
Figure 13:
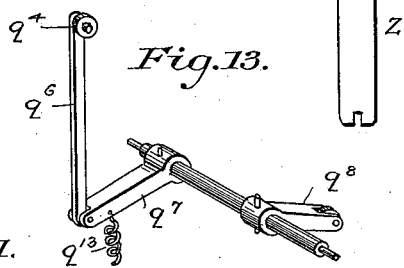
Figure 11:
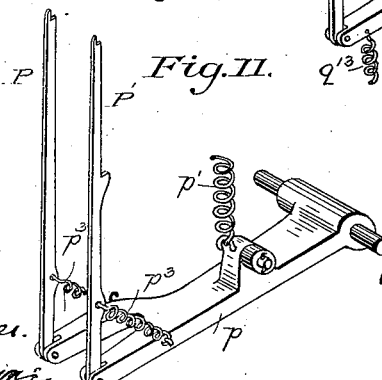
Figure 31:
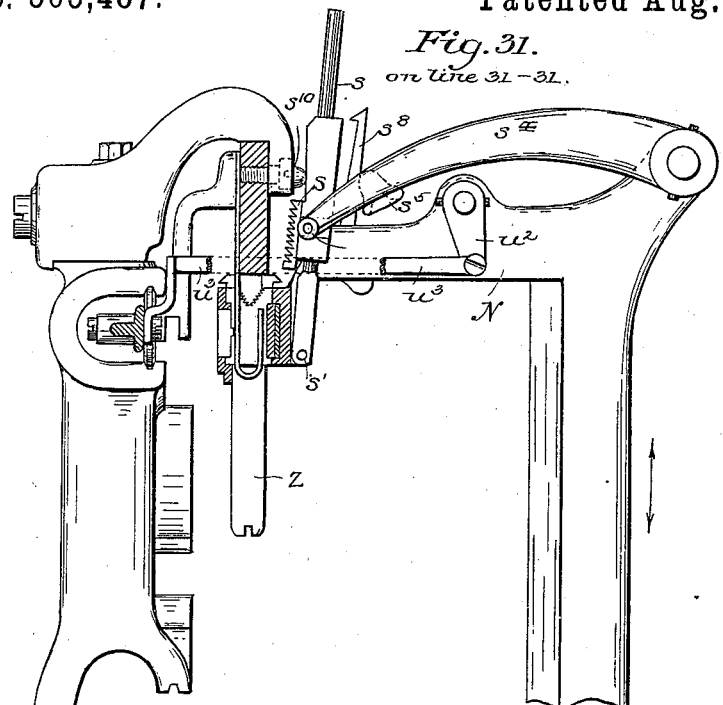
Figure 32:
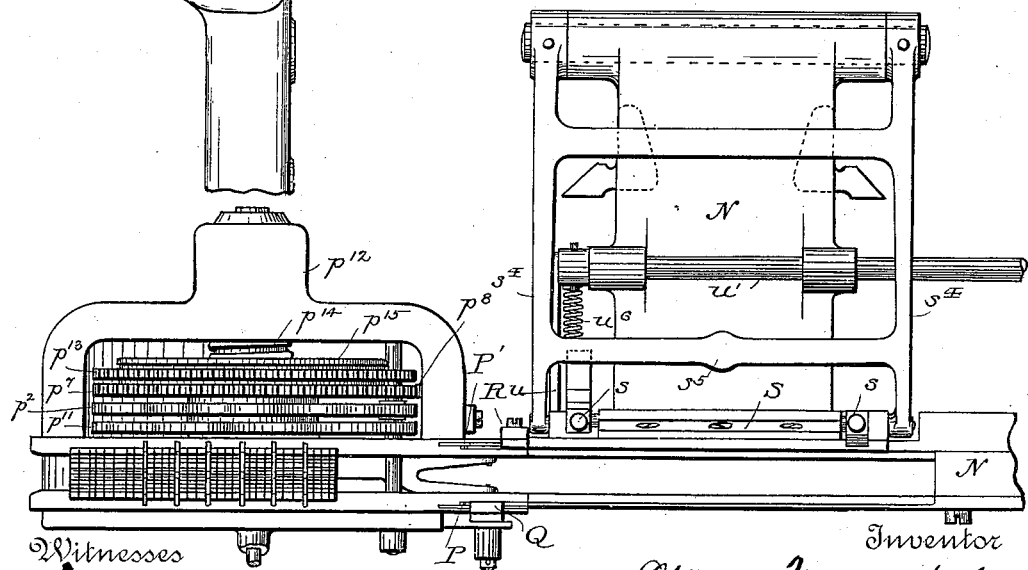

5 is a front view showing a composed line of matrices and spaces as delivered from the composing or assembling mechanism to the transferring devices. Fig. 4ᵃ is a perspective view of a detail hereinafter described. Fig. 6 is a vertical cross-section on the line 6 6 of Fig. 5, showing the manner in which the composed line is sustained in the transferring or shifting carriage. Fig. 7 is a front elevation of the mechanism by which the spaces are given their first elevation or advancement through the line during the transference of the latter from the composing toward the casting mechanism. Fig. 8 is an end view of the parts shown in Fig. 7. Fig. 9 is a vertical cross-section on the line 9 9 of Figs. 1 and 7. Fig. 10 is a side view of the cam by which the spaces are elevated, as above mentioned. Fig. 11 is a perspective view of the space-elevating fingers actuated by the cam, Fig. 10. Fig. 12 is a side view of the cam through which the devices are actuated to hold the spaces when elevated in the line and to prevent them from dropping out of position. Fig. 13 is a perspective view of the intermediate devices through which the cam, Fig. 12, operates the devices for maintaining the space-bars. Figs. 14, 15, and 16 are front elevations illustrating the action of the devices for lifting the space-bars and holding them in position when lifted above the line and transferred to the casting mechanism. Fig. 17 is an elevation showing the manner in which a last space is prevented from entering a line having insufficient space to admit it, the line being opened by the shoulder on the space. Fig. 18 is a similar view showing the manner in which the space is slightly retracted to withdraw its shoulder and permit the closing of the line. Fig. 19 is a perspective view of the intermediate passage through which the composed line is transferred, together with the devices for lifting the spaces and maintaining them in position. Fig. 20 is a vertical cross-section through the casting mechanism and adjacent parts, on the line 20 20 of Fig. 1. Fig. 21 is a front view showing a composed line of matrices and spaces after the spaces have been lifted in the intermediate passage and while the line is being lowered to its position in front of the mold. Fig. 22 is a front elevation showing a line of matrices and spaces as they appear immediately after the elevator has lowered the line to its position in front of the mold. Fig. 23 shows the same line of matrices after the confining-jaws have been slightly opened and the shoulders or steps of all the spaces fully entered in the line. Fig. 24 illustrates the same line at the completion of the justification action, each space having its step or section which is in use fully entered into the line to cover the face of the mold. Fig. 25 is a sectional view on an enlarged scale, showing the manner in which the step or shoulder on a space will sometimes be entered partly into a line which is incapable of receiving it. Fig. 26 is an elevation of the parts used for completing the justification of the line in front of the mold, looking forward against their rear faces. Fig. 27 is a top plan view of the same parts. Fig. 27ᵃ is a top plan view of the justifying devices, together with the melting-pot, from which certain of these devices receive motion. Fig. 28 is a vertical section on the line 28 28 of Fig. 27. Fig. 29 is a vertical section on the line 29 29 of Fig. 27, showing particularly the action of the pawl, which permits the last space to be drawn into the line. Fig. 30 is a side elevation of the parts shown in Figs. 26 and 27, portions being shown in section on the line 30 30 of Figs. 26 and 27. Fig. 31 is an elevation looking in the direction of the arrow 30, Fig. 1, with the elevator raised and the elevator and overlying bar in section on the line 31 31. Fig. 32 is a top plan view of the parts shown in Figs. 26 and 27, together with the adjacent parts for lifting the spaces primarily different heights in the line. Figs. 33 and 34 are outline elevations showing the mechanism for opening and closing the jaws or abutments by which the matrices are confined in front of the mold and the length of the line limited, the actuating-lever being shown in a vertical plane parallel with the jaws, instead of a plane at right angles thereto as in practice, in order to show more clearly its action.

Referring to Fig. 1, B represents the inclined channeled magazine, in which the single-letter matrices, such as shown in Fig. 4, are stored, and from which they are delivered one at a time by finger-keys D to the intermediate mechanism. The falling matrices, bearing the characters in the order in which they are to appear in print, descend through the channels G to an inclined belt H, by which they are carried downward and forward into a slotted assembler-block I, where they are arranged in line side by side, the line being steadily advanced against a yielding resistant J, as the successive matrices are added to its rear end. The assembler-block I has a vertical motion for the purpose of elevating the line of matrices between the transferring-fingers L and L', which, together with their supporting-slides, are commonly designated as the "shifter" or "transfer-carriage." This shifter serves to transfer the line of matrices horizontally from the assembling-block through the intermediate supporting-channel M to the vertically-movable yoke or elevator N, by which the line is lowered to the face of the mold O and afterward lifted to the distributing devices, as hereinafter explained, these parts being all constructed and arranged to operate, except as to details hereinafter mentioned, in essentially the same manner as in Patent No. 436,532.

In proceeding to carry my invention into effect I first provide a series of space-bars, hereinafter termed "spaces," as shown at Z, Fig. 2, consisting of a thin bar or plate of metal provided at the upper end with sustaining shoulders $z$ and $z'$, the latter being beveled on their outer edges, as shown, for purposes which will hereinafter appear. The body of the space is increased in thickness step by step from one end to the other, so that it presents at different points in its length four thicknesses, more or less. Each section or thickness is of a length corresponding substantially with the length of a matrix, or somewhat less, and its opposite sides parallel or practically so. The surface rises from one step or section to the next gradually, so as to present the inclined surface or shoulder $z^2$, which admits of the space being thrust the more readily into and through the line to effect the separation of the adjoining matrices. If preferred, the spaces can be made as shown in Fig. 3, with steps or shoulders on both faces instead of on one face only, as in the first form. The number of spaces employed will depend upon the size and speed of the machines, but the spaces may be alike in all respects. These spaces will be placed in the box or magazine K and delivered therefrom by a finger-key mechanism, one at a time, into the line in course of composition in the assembling-block, in the same manner that the space-bars in my original machine were introduced.

In carrying the present invention into effect the first step toward justification, after the completion of the composition, is to advance the spaces successively through the line short distances, so that they will present an increased thickness in the line, and so that each space will be advanced a little farther into or through the line than the next, as shown in Fig. 21. This is effected as the line is carried to the left by the shifter-carriage L and L' through the intermediate channel M.

The shifter-carriage is modified in construction, as shown in Fig. 5, its two depending fingers being rigidly connected and one of them provided on the inner side with a horizontally-sliding jaw $l$, pressed inward by a spring $l'$. When the carriage is at its normal position on the right, directly over the assembling-block I, the jaw $l$ is in contact with a stationary stop $l^2$ on the frame, whereby it is held back to the left against the pressure of the spring so as to leave the space between jaw $l$ and the arm L equal to the standard length of line. When, therefore, the assembling-block I is raised with the composed line therein, it will present the line within the shifer-carriage between the arm L and the yielding jaw $l$.

As the assembler moves to the left (see Fig. 5) the jaw $l$, relieved from the stop $l^2$, is pressed inward by the spring so that the composed line is pinched endwise and held with a moderate pressure in the shifter-carriage. While the line is thus held, as shown in Fig. 5, the carriage continues its movement to the left, carrying the line through the intermediate channel or guide M into the elevating-yoke N. During the gradual movement of the line through the intermediate channel or passage M, I effect the elevation of the spaces through the line one at a time by the mechanism shown more particularly in Fig. 1 and Figs. 7 to 19, consisting, primarily, of two parallel lifting-fingers P and P', such as shown in Fig. 11, which are arranged to play up and down in the front and rear walls of the passage, as shown in Figs. 1, 7, 8, 19, and 32. These fingers are shouldered at their upper ends and arranged in such position that as the line advances each space in turn has its upper ears carried against the shouldered fingers in position to be elevated thereby, as shown in Fig. 19. The lifting-fingers are pivoted at their lower ends to an operating-lever $p$, which is elevated by a spiral spring $p'$ and depressed by a cam-wheel $p^2$, separately shown in Fig. 10, which acts on a stud or roller on the lever $p$, as shown in Figs. 7, 8, and 10. The lifting-fingers are connected to the operating-lever also by intermediate springs $p^3$, which admit of the upper ends of the fingers yielding and moving forward horizontally with the advancing line to a limited extent. It will be observed that this arrangement permits the ends of the fingers to move forward with the line while in the act of raising the spaces. As the fingers descend after lifting a space their upper ends pass below its ears and the springs $p^3$ immediately throw them backward toward the advancing line in position to engage the ears of the next space. The only essential requirement in this regard is that the fingers shall have not only a rising-and-falling motion, but also freedom of movement in a horizontal direction.

The lifting-fingers stand normally at rest in a depressed position, and are set in action by the spaces in the manner following: The lifter-actuating cam $p^2$ is connected (see Figs. 7, 8, and 9) with a gear-wheel $p^7$, engaging the pinion $p^8$, the shaft of which carries a stop-arm $p^9$. The stop-arm $p^9$ rests normally, as shown in Fig. 7, on the shoulder of the lifting-finger P, thus preventing the rotation of the pinion and cam-wheel, so that the fingers remain at rest. When an advancing space in the line encounters the fingers and pushes them backward, the stop-shoulder is disengaged from the stop-arm $p^9$, as shown in Fig. 14, and thus the cam-wheel is unlocked, so that it may operate the lifting-fingers. After the fingers have lifted one space they fall to their original position, immediately stopping the cam-wheel and holding the same at rest until the next space encounters the fingers. This is continued indefinitely, the fingers being released by and acting to elevate one space, and then falling and locking the parts until they are released by the next space. The cam $p^2$, driving-gear $p^7$, and cam $p^{11}$, to be presently described, are all mounted, as shown in Fig. 9, on a hollow shaft revolving on a stud $p^{12}$.

Motion may be transmitted to the parts by frictional driving devices of any character; but I prefer to mount on the hollow shaft a gear $p^{13}$, subjected to a side pressure by means of a spring $p^{14}$ and a disk $p^{15}$, which is pushed forward by a spring, so as to subject the gear $p^{13}$ to a pressure on its side face. The gear $p^{13}$ is driven by a pinion $p^{16}$, the shaft of which is in turn provided with a pulley $p^{17}$, driven by a belt from any suitable part of the machine, through which it will receive continuous motion. The cam $p^2$, which controls the rising action of the lifting-fingers, has its periphery formed with a series of steps or elevations rising different distances from the center in such manner that the successive spaces are lifted to different elevations in the line, each being advanced a slightly greater distance than the next, as represented in Fig. 21. This continues until the cam-wheel $p^2$ has completed a revolution, after which the next space will be left in the lowest position, and the successive spaces lifted each a greater distance than the next. The essential requirement is simply that the different spaces shall be lifted to different heights in the line, and the order in which they are thus lifted is of minor importance. If the vacancy to be filled in the line permits, all of the spaces in the line will be advanced, as shown; but if the vacancy to be filled is so small that the elevation of a portion of the spaces fills the line to the requisite length, the remaining spaces will refuse to enter because of their shoulder lodging against the lower ends of the matrices and wedging fast between them, as illustrated in Fig. 25. In such case the spring which actuates the elevating-fingers is unable to overcome the resistance offered to the spaces, and the line will then go forward with a portion of the spaces elevated and the remainder in their original positions. This preliminary adjustment of the spaces in the intermediate channel may or may not complete the justification, depending on the amount of space to be filled out. If the last space stands with a shoulder or step partly entered between the matrices, as shown in Fig. 25, it is necessary to slightly retract it, so that the matrices can close together against the thinner section, which is fully entered. This is effected by a finger Q. (See Figs. 1, 7, and 8, Figs. 14 to 18, and Fig. 19.) This finger is pivoted at its lower end in such manner that its upper end, which projects above the intermediate channel, may have a limited vibration in the direction in which the matrix-line travels. The finger is provided on its inner face with a series of horizontal teeth $q$, intended to engage the ears of the elevated spaces and prevent them from falling down as the line is shifted to the left. The lifting devices elevate the spaces and leave them in such position that if their steps or shoulders are fully entered in the line the ears at their upper ends will stand in position to pass between the teeth of the sustaining-finger Q.

The lowermost of the teeth is beveled or inclined on the under side, as shown at $q'$, in such manner that if a space stands in a slightly-elevated position with its shoulder partly entered in the line, as shown in Figs. 17 and 25, the inclined surface will override the top of the space, as shown in Fig. 18, and push the same downward sufficiently to carry the shoulder out of the line. In order that the toothed finger Q may thus operate and that it may properly engage the ears of the matrices lifted to different heights, it is provided on one edge (see Figs. 14 to 19) with steps or shoulders $q^2$ and $q^3$, which are acted upon by a roller $q^4$, lying between them and one of the lifting-fingers. This roller is carried by the upper end of an arm $q^6$, pivoted at its lower end to the lever $q^7$, the latter being, as shown in Figs. 7, 12, and 13, mounted on a rock-shaft having an arm $q^8$, which is depressed by a cam-wheel $p^{11}$, previously mentioned and separately illustrated in Fig. 12. This cam acts through the intermediate parts to lift the roller $q^4$ and thereby carry the grooved finger Q to the left, the direction in which the spaces are moved with the line. A spring $q^{13}$ tends to pull the roller downward and let the finger Q swing back to the line under the influence of spring $q^{14}$, connected thereto.

It will be seen that after each space is lifted the finger Q, swinging forward, will either force the same down or engage one of its ears and hold it up, the ears of the space sliding horizontally along the teeth of the finger, as shown in Fig. 16. Fig. 14 shows the lifting-fingers just as they have been released by the action of the spaces and previous to lifting the same. Fig. 15 shows the fingers and the spaces in their elevated position with the finger Q still to the left. In Fig. 16 the finger Q is moved over the line, so as to engage and maintain the spaces for the time being. As the spaces continue their movement with the line toward the left it is necessary that they should receive continued support. This is effected by providing at the opposite side of the passage from the finger Q a stationary finger R, with which the ears of the spaces engage as they advance horizontally to the left. It is necessary, however, that the spaces shall, after passing this stationary finger R, still receive support while they are being transferred to the elevator N, by which they are lowered to the position in front of the mold. This continued support of the spaces in their adjusted position is secured by the horizontally ribbed or toothed plate S, arranged to register with or form a continuation of the stationary finger R, so that, as the matrix-line is carried along, the ears of the spaces will travel from finger R to plate S and be sustained by the teeth of the latter, as represented in Fig. 30.

The plate S is mounted to slide upward and downward on the guide-rods $s$ to the rear side of the elevator N. The guide-rods are pressed forward by a flat spring $s^2$, (see Figs. 20, 29, and 31,) which acts to keep them in a vertical position in order to hold the plate S in engagement with the ears of the spaces. The spring $s^2$ permits the guide-rods to tip backward with the plate S in order to disengage the latter from the ears of the spaces at the proper time, as shown in Fig. 31. The plate S serves also the additional purpose of pulling the spaces through the line while the latter is in front of the mold, in order to fill the line out to the requisite length if further spreading is necessary. To this end the plate S is jointed at its ends to two arms $s^4$, connected by horizontal pivots to the rising-and-falling elevator-frame and connected by a cross-bar $s^5$, arranged in such position that when the elevator descends to place the line in front of the mold this cross-bar will encounter the top of a vertically-sliding rod $s^6$, guided in the main frame and sustained by a spiral spring $s^7$.

When the elevator descends with the line, the rod $s^6$ arrests the descent of the arms $s^4$ and plate S, so that the latter holds the spaces at rest while the line descends, carrying the matrices toward the lower and thicker ends of the spaces. This action will leave the spaces as shown in Fig. 22. It may chance that one of the spaces will have its inclined shoulder partly entered in the line, as shown in Figs. 22 and 25. To provide for this, I slightly separate the vise-jaws X X' at each action of the machine in order to admit of the step being crowded into the line, after which the jaw is again closed, it being found that there is sufficient elasticity in the line to admit of this being done to the slight extent necessary. When the jaw is retracted, as above stated, it is necessary to guard against the plate S being forced upward by the spring-actuated rod $s^6$ so far as to carry additional spaces into the line. For this purpose I provide a stop-pawl $s^8$, pivoted to the elevator N to engage at its upper end with the teeth on the back of the plate S, as shown in Figs. 29 and 30. This pawl is pivoted so that it normally falls back by gravity away from the plate S, but as the vise descends to complete its movement the rear end of the pawl encounters a yielding or spring-supported stud $s^9$ in the frame, whereby the pawl is thrown forward into engagement with the teeth, which are so spaced that they permit the plate S to rise only short distances, sufficient to fully enter into the line the shoulder of the last space, as shown in Fig. 23. It may and usually will happen, however, that certain of the spaces in the line will at this time stand in such positions that their thickest sections in the line do not lie far enough between the matrices to completely close the mold. It is therefore necessary to advance them until they fill the line solidly between the matrix characters, as shown in Fig. 24. To effect this, the last step in the operation, I provide a rising-and-falling blade T, commonly known as the "executor," having horizontal ribs or teeth $t$, designed to engage the heads or shoulders of the spaces and carry them upward through the line to the required distance. This blade is connected at its upper end to operating-arms $t'$, fixed on a rock-shaft $t^2$, which is mounted in the main frame and provided with an arm $t^3$, carrying a roller, which rides on the inclined top of the melting-pot. This pot has a motion to and from the mold, as usual, so that as it swings forward preparatory to delivery of the metal into the mold it acts through the intermediate parts to lift the blade T. The operating-arm $t^3$ is mounted loosely on the rock-shaft, but it acts through an intermediate spring $t^4$ on an arm $t^6$, fixed to the shaft, so that the motion is imparted to the blade T through yielding devices.

It will be observed that the parts described constitute simply a yielding connection between the arm $t^3$ and the executor-blade T.

After the casting operation is completed and as the elevator carries the line upward for distribution it is necessary to drop all the spaces through the line until their heads rest on the elevator that they may be shifted therefrom, after it is raised, to the distributing devices. This is done by opening the clamping-jaws slightly to relieve the line and by disengaging the plate S from the spaces, as shown in Fig. 32. This disengagement is effected by means of a stud or projection $s^{10}$ on the frame riding against the beveled upper surface of the plate S on its guides. It is usual to provide the elevator N at its right end with pawls or dogs to hold the matrices therein during their elevation and until they are released for transference to the distributing devices above. In place of these retaining-pawls I now employ the mechanism shown in Figs. 27 and 28, the elevator being provided with a transversely-sliding dog or gate U, which entering through the side projects across the path of the matrices. Its rear end is connected to an arm $u$ on a rock-shaft $u'$, mounted on the elevator-frame. This shaft is also provided at the opposite end with a second arm $u^2$, connected to a sliding rod $u^3$, beveled on its end, so that as the elevator rises and falls the rod will encounter a stationary stop and cause the gate to be retracted in order to admit of the matrix-line sliding horizontally into and out of the elevator, as indicated by the arrow in Fig. 27. A spring $u^6$ tends to advance the gate into the elevator in position to hold the matrices therein. The opening and closing of the jaws or abutments to clamp the line endwise may be effected by any suitable means, such, for example, as that shown in Figs. 33 and 34, in which the jaw X is connected by a bar $x$ to a lever $x^4$, which is fulcrumed at $x'$ to a block $x^2$, provided with a screw $x^3$, seated against the back of the jaw $x'$, so that when the outer end of the lever is raised the jaws are brought closer together, and vice versa. The lever is connected to an actuating-rod $x^5$, lifted by spring $x^6$ and connected to the main lever $x^7$, which is actuated by a depressing-cam $x^8$, mounted on the main shaft and so shaped on the edge as to cause the repeated opening and closing of the jaws during each justifying action. During the first justifying action they are closed to the standard length of line, then slightly opened, and finally closed again to the original first position.

The operation of the justifying mechanism as a whole is as follows: The line of matrices and spaces is first composed in the assembling-block I with the thin ends of the spaces in the line, as shown in Fig. 5. The assembler is then lifted, placing the line between the fingers of the shifter-carriage L, as shown in Fig. 5. This carriage then moves slowly to the left with the line presenting the upper end of the spaces in succession to the lifting-fingers P and P', by which the spaces are lifted through the line different distances, so that they occupy the relation shown in Fig. 21. If either of the spaces presents an inclined shoulder in the line, as shown in Fig. 22, it is backed out by the inclined shoulder $q'$ of the finger Q, as before explained. The line in the condition shown in Fig. 21 is now transferred to the elevator N, and the shoulders of the spaces engage with the teeth of the plate S. The line is now lowered by the elevator toward the mold, the ears of the spaces remaining meanwhile in engagement with the plate S, which is sustained and urged upward by the spring-supported rod $s^6$, causing the spaces to assume the position shown in Fig. 23. The blade T now acts, carrying the spaces upward until their sections already entered in the line are carried forward so as to tightly fill the space between the matrices and close the mold, as indicated in Fig. 24.

It is to be observed that in the mechanism above described there is always a definite and fixed relation between the positions in which the spaces are adjusted to complete the elongation of the line and the executor-blade T, so that the latter is always certain to engage the spaces and carry them to definite and proper positions in the line.

Another and important feature of the invention which I consider broadly new, is that for retracting slightly any space which has the end or shoulder of a step crowded partly into the line, and it is to be understood that any device which will serve this purpose is to be considered the mechanical equivalent of that shown herein.

I do not claim, broadly, herein mechanism for advancing stepped spaces through the line unequally or successively, nor do I claim the simultaneous advancement through the line of a series of spaces in their previously-adjusted relations, these features being the subject-matter of an earlier application, Serial No. 479,370. Neither do I claim herein, broadly, the advancement of a space-adjusting pusher different distances, to effect a corresponding advancement of the spaces through the line, this feature being the subject-matter of claims in my application, Serial No. 479,370. Neither do I claim, broadly, herein the reciprocating pusher for the spaces, constructed to move laterally with the shifting line, this feature being claimed in my previous application, Serial No. 327,079.

I do not claim, broadly, herein means for sustaining a space or section of a space when elevated in the line, as described and claimed in my application for patent, Serial No. 463,585. I believe the present to be the first mechanism, however, adapted to engage the spaces at any height to which they may be adjusted and hold them in such adjusted positions.

I believe the present to be the first instance in which unitary or one-piece stepped spaces have been combined with mechanism by which their steps are first entered in the line to effect its elongation, and that thereafter the spaces advance bodily until the entered steps are carried past the casting-point, and so that their side faces bear tightly against the adjacent matrices to prevent the existence of any joint or opening through which the molten metal can escape.

Having thus described my invention, what I claim is—

1. The combination of a line of matrices, a series of stepped spaces, means for introducing the thin ends of said spaces into the line, means for adjusting the spaces endwise, with their steps in different relations to the line, means for advancing the spaces thus adjusted simultaneously that they may act successively to increase the length of the line to the predetermined limit, means for releasing the line that it may expand endwise to facilitate the entrance of the last step necessary, means for advancing the entered step fully into the line, means for finally compressing the line to the required length.

2. In a justifying mechanism and in combination with a line of matrices, a series of stepped spaces, means for inserting said spaces with their thin ends in the line, means for limiting the elongation of the line, means for advancing the spaces until they extend the line to the limit, means for withdrawing the partly-entered shoulders of the spaces from the line, and means for finally advancing all the entered steps fully into the line.

3. In a justifying mechanism, means for shifting the matrix-line endwise, a pusher having a variant movement to advance the spaces different distances through the line, and frictional driving devices therefor.

4. In a justifying mechanism a line of matrices, stepped spaces therein, a line-shifting carriage provided with a yielding member to compress the line and adapted to limit the final length of the line, a pusher arranged to reciprocate transversely of the line and also move with the line.

5. In a justifying mechanism, a line of matrices and stepped spaces therein, in combination with a line-shifter, a reciprocating and laterally-yielding pusher to advance the spaces through the line, and pusher-driving mechanism controlled by the lateral movement of the pusher.

6. In a justifying mechanism, a line of matrices and stepped spaces therein, in combination with a line-shifter and a reciprocating pusher and driving mechanism thrown into action by the action of the spaces.

7. In combination with a line of matrices and stepped spaces therein, a line-shifter which limits the length of the line, means to advance the spaces through the line successively, and means for retracting spaces having shoulders partly entered in the line.

8. In combination with a line of matrices and stepped spaces therein, an arm having an inclined surface to push back spaces having their shoulders partly entered in the line.

9. In combination with the line of matrices and adjustable stepped spaces therein, and means for shifting the line laterally, a sustaining device adapted to engage the spaces and maintain them at any height at which they may be adjusted.

10. In combination with a line of matrices and stepped spaces therein, and means for shifting spaces endwise, the vibrating finger provided with a series of teeth to engage and sustain the spaces.

11. In combination with the line-shifter, the space lifter or pusher, the vibrating toothed finger to sustain the spaces, and the stationary toothed finger to sustain the spaces.

12. In combination with the line of matrices and stepped spaces, the descending elevator or yoke to sustain the line, and means to engage and hold the spaces from descending as the matrices are lowered in relation to them.

13. In combination with the line of matrices the stepped spaces therein, the falling elevator to sustain them, and yielding devices to resist the descent of the spaces with the line, whereby the spaces are caused to fill out the line.

14. In combination with the matrix-line and stepped spaces, the falling elevator to sustain them, means to resist the descent of the spaces and means for advancing the matrices along the spaces in order that the latter may fully enter their steps into the line.

15. In a justifying mechanism, the combination of the matrix-line, the stepped spaces, means to sustain the spaces in the line, means to relieve the line from pressure endwise to a limited extent, and means allowing the released spaces to advance a limited distance, whereby partly-entered shoulders are fully entered into the line.

16. In a linotype-machine and in combination with the space-adjusting blade and the movable melting-pot, the intermediate connections through which the latter moves the former.

17. In combination with the rising-and-falling elevator, the matrices and the stepped spaces, the toothed plate to engage the spaces, and a yielding support for said plate, whereby it is caused to urge the spaces with a yielding action through the line.

18. In a justifying mechanism and in combination with a line of matrices and stepped spaces therein, jaws or abutments to limit the length of the line, means for adjusting the spaces through the line to effect its elongation, and means for separating the jaws to permit the entrance of the last step and thereafter closing the jaws.

19. In a justifying mechanism, in combination with a line of matrices and stepped spaces in said lines, jaws or abutments to limit the final length of the line, means for adjusting the spaces in the line, and means for opening and again closing the jaws.

20. In a justifying mechanism, in combination with a line of matrices and stepped spaces therein, mechanism for adjusting the spaces, and mechanism for automatically compressing the line after the final adjustment of the spaces.

21. In a justifying mechanism and in combination with a line of matrices and stepped spaces, mechanism for advancing the spaces through the line to elongate the same, means for limiting such elongation of the line, and mechanism for causing the retreat of partly-entered steps which are unable to fully enter the line.

22. In a justifying mechanism employing elongated stepped spaces, a space-advancing device and a frictionally-acting driving mechanism therefor, whereby the spaces are forced into the line with a limited pressure.

23. The method of justifying a composed line of matrices, consisting in introducing into the line the thin ends of stepped spaces, urging the spaces forward through the line until the latter is elongated to or beyond the required limit, and withdrawing from the line one or more partly-entered steps unable to enter, that the line may be tightly closed.

24. The method of justifying a line of matrices, consisting in introducing into said line the thin ends of elongated stepped spaces, advancing said spaces through the line until the latter is elongated to or beyond the required limit, withdrawing the partly-entered steps of one or more spaces, if such there be, and carrying the remaining entered steps fully into the line.

25. The method of justifying a line of matrices consisting in advancing elongated stepped spaces through the line until it is elongated to the required length, withdrawing any final partly-entered step which is unable to enter the line relieving the line endwise to permit the free entrance of the remaining entered steps, and finally compressing the line endwise.

26. In a justifying mechanism and in combination with a line of matrices and a series of spaces increasing in thickness from one end toward the other, mechanism for advancing the line of matrices lengthwise of the spaces to effect the elongation of the line.

27. In combination with a support therefor, a line of matrices, stepped spaces movable endwise through the line to expand the same, jaws or clamps to limit the expansion of the line, mechanism to advance the spaces and effect approximate justification, and means for closing the jaws to slightly compress the line to the predetermined length.

28. In a justifying mechanism and in combination with a line of matrices, spaces movable endwise through the line, a space-adjusting device adapted to engage the ends of the spaces and move them through the line with a pulling action.

29. In a justifying mechanism and in combination with a line of matrices, a series of stepped spaces movable endwise through the line, and an operating mechanism arranged to engage the thin ends of said spaces and pull them through the line to the required positions.

30. In a justifying mechanism and in combination with a line of matrices, a series of unitary stepped spaces movable endwise through the line, their parallel side faces adapted to bear tightly against the matrices at the casting-point, means for adjusting the spaces endwise and entering the proper steps into the line to effect its elongation, and means for finally advancing the spaces bodily to carry the previously-entered steps to predetermined positions in the line, that they may tightly close the same at the casting-point.

In testimony whereof I hereunto set my hand, this 19th day of July, 1893, in the presence of two attesting witnesses.

OTT. MERGENTHALER.

Witnesses:
PH. H. HOFFMAN,
JAS. GLEN.

Correction in Letters Patent No. 565,487.

It is hereby certified that the assignee in Letters Patent No. 565,487, granted August 11, 1896, upon the application of Ottmar Mergenthaler, of Baltimore, Maryland, for an improvement in "Linotype-Machines," should have been described and specified as *The Mergenthaler Linotype Company, of New York, N. Y., a corporation of New Jersey,* instead of "the Mergenthaler Linotype Company, of New York, N. Y.;" and that the said Letters Patent should be read with this correction therein that the same may conform to the record of the case in the Patent Office.

Signed, countersigned, and sealed this 18th day of August, A. D., 1896.

[SEAL.]

JNO. M. REYNOLDS,
*Assistant Secretary of the Interior.*

Countersigned:
S. T. FISHER,
*Acting Commissioner of Patents.*